United States Patent
Kiyoshige (10) Patent No.: US 9,146,321 B2
(45) Date of Patent: Sep. 29, 2015

(54) WIRELESS COMMUNICATION APPARATUS

(71) Applicant: OLYMPUS CORPORATION, Tokyo (JP)

(72) Inventor: Ryuichi Kiyoshige, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 406 days.

(21) Appl. No.: 13/655,045

(22) Filed: Oct. 18, 2012

(65) Prior Publication Data

US 2013/0099961 A1   Apr. 25, 2013

(30) Foreign Application Priority Data

Oct. 20, 2011 (JP) .................................. 2011-230675

(51) Int. Cl.
    *G01S 19/28*   (2010.01)
    *G01S 19/24*   (2010.01)

(52) U.S. Cl.
    CPC  *G01S 19/28* (2013.01); *G01S 19/24* (2013.01)

(58) Field of Classification Search
    USPC ............. 342/357.25, 357.42, 357.63, 357.71; 701/468, 470
    See application file for complete search history.

(56) References Cited

U.S. PATENT DOCUMENTS

| | | | |
|---|---|---|---|
| 2001/0002455 A1* | 5/2001 | Uekawa et al. | ............... 701/200 |
| 2011/0234815 A1* | 9/2011 | Zahnert et al. | ............. 348/207.1 |

FOREIGN PATENT DOCUMENTS

| | | | |
|---|---|---|---|
| JP | 06-207976 | A | 7/1994 |
| JP | 2003-344523 | A | 12/2003 |
| JP | 2004-061336 | A | 2/2004 |
| JP | 2005-049296 | A | 2/2005 |
| JP | 2007-336289 | A | 12/2007 |
| JP | 2009-264928 | A | 11/2009 |
| JP | 2010-127850 | A | 6/2010 |
| JP | 2011-017555 | A | 1/2011 |

OTHER PUBLICATIONS

Japanese Office Action dated Oct. 21, 2014, issued in Japanese Patent Application No. 2011-230675; w/English Translation. (6 pages).

\* cited by examiner

*Primary Examiner* — Dao Phan
(74) *Attorney, Agent, or Firm* — Westerman, Hattori, Daniels & Adrian, LLP

(57) ABSTRACT

A wireless communication apparatus may include an instruction unit that instructs a peripheral terminal to acquire a navigation message transmitted from a global positioning system (GPS) satellite, an acquisition unit that acquires the navigation message, which has been acquired by the peripheral terminal, from the peripheral terminal, and a calculation unit that carries out a positioning calculation by using the navigation message acquired by the peripheral terminal.

8 Claims, 8 Drawing Sheets

WIRELESS COMMUNICATION APPARATUS

BACKGROUND OF THE INVENTION

1. Field of the Invention

The present invention relates to a wireless communication apparatus.

Priority is claimed on Japanese Patent Application No. 2011-230675, filed Oct. 20, 2011, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

Recently, the number of mobile devices having a global positioning system (GPS) receiver has increased in the market. Various applications or services in which a user easily acquires current position information to assign the position information to a photo and arrange the photo on an electronic map or notify a friend of a current position are developing.

A positioning system using GPS satellites receives signals transmitted from a plurality of GPS satellites and calculates a position of a GPS receiver based on navigation messages of the GPS satellites included in the signals. The navigation messages include orbital information of the GPS satellites. Using this orbital information, the GPS receiver can compute which GPS satellite is currently flying over the GPS receiver.

When GPS positioning is performed for the first time, when a current position is significantly different from a position in which previous GPS positioning has been performed, or when a time has significantly elapsed after the last positioning has ended, the GPS receiver does not have an appropriate navigation message. Accordingly, because the GPS receiver does not know which GPS satellite is flying overhead, it is necessary to search for all GPS satellites in a round-robin mode. In general, a positioning start from this state is referred to as a cold start, and a significant time for positioning is required.

The GPS receiver records the navigation messages of the GPS satellites within the GPS receiver once positioning is performed. Thereby, because the GPS receiver can find which GPS satellite is flying overhead using the recorded navigation message during the next positioning, it is possible to significantly shorten the time required for positioning. However, a state in which the GPS receiver does not record appropriate navigation messages within the GPS receiver often occurs. For example, this occurs when the GPS receiver initially starts up after the GPS receiver is purchased, when the GPS receiver is moved and used overseas, or the like. At the time of this condition, several minutes may be required to complete positioning.

A method of shortening a time required for positioning by suppressing unnecessary radiation radio waves due to performing a function other than a positioning function (for example, see Japanese Unexamined Patent Application, First Publication No. 2004-061336) or a method of shortening a time required for overall positioning by appropriately setting a setting value of a time limit during start-up in a hot start or a cold start according to a start-up mode (for example, see Japanese Unexamined Patent Application, First Publication No. 2003-344523) is well known.

A signal radio wave from the GPS satellite is modulated by a code unique to each GPS satellite referred to as a coarse/acquisition (C/A) code. The GPS receiver side finds the C/A code included in a signal from the GPS satellite and demodulates the signal. Because the C/A code is iterated at 1,023 chips as one cycle at a frequency of 1.023 MHz, unique values are each allocated to 32 GPS satellites currently being operated.

If the GPS receiver does not have orbital information of a GPS satellite when moving to a position far away from a position during initial start-up or a position in which previous positioning has been performed, when positioning is resumed, or the like, it is not possible to estimate where the GPS satellite is currently flying. Accordingly, it is necessary to detect the C/A codes allocated to the 32 GPS satellites in the round-robin mode with a shift for every phase so as to find a GPS satellite from which a signal has been transmitted.

In addition, a position suitable for radio-wave reception is desirable to search for a signal transmitted from a GPS satellite, but a position in which the user actually performs positioning using the GPS receiver is not necessarily the position suitable for the radio-wave reception. Thus, a significant time is necessary for the GPS receiver to search for the GPS satellite according to a reception condition of a signal to be transmitted by the GPS satellite.

For the navigation message transmitted from the GPS satellite, 5 sub-frames form one frame and one frame is transmitted as a unit of data. Because the transmission rate of a signal to be transmitted from the GPS satellite is 50 bps, a time of 30 seconds is necessary for the GPS receiver to receive the navigation message of one frame. Further, because the GPS receiver will not carry out a calculation unless receiving navigation messages from four or more GPS satellites so as to perform three-dimensional positioning, a significant time is further required until the positioning calculation is carried out. In a method of performing imaging just after power is applied as in a mobile device carried by a user, particularly, a digital camera, and recording position information of an imaging point, a time required for this positioning is not in a permitted range.

SUMMARY

The present invention provides a wireless communication apparatus capable of shortening a time for searching for a GPS satellite and further shortening a positioning time.

A wireless communication apparatus may include: an instruction unit that instructs a peripheral terminal to acquire a navigation message transmitted from a global positioning system (GPS) satellite; an acquisition unit that acquires the navigation message, which has been acquired by the peripheral terminal, from the peripheral terminal; and a calculation unit that carries out a positioning calculation by using the navigation message acquired by the peripheral terminal.

The wireless communication apparatus may further include: a determination unit that determines the GPS satellite to be allocated to the peripheral terminal from among a plurality of GPS satellites. The instruction unit may instruct the peripheral terminal to which the GPS satellite has been allocated to acquire the navigation message transmitted from the GPS satellite.

The wireless communication apparatus may further include: a communication unit that transmits a synchronization message for acquiring time synchronization with its own apparatus to the peripheral terminal.

The communication unit may transmit the synchronization message including information indicating a time taken to transfer data between its own apparatus and the peripheral terminal.

The wireless communication apparatus may further include: a reception unit that receives the navigation message from the GPS satellite. The calculation unit may carry out the positioning calculation by using the navigation message acquired by the acquisition unit and the navigation message received by the reception unit.

The instruction unit may issue the instruction to a plurality of peripheral terminals. The acquisition unit may acquire the navigation messages from the plurality of peripheral terminals. The calculation unit may carry out a positioning calculation by using the navigation messages acquired by the plurality of peripheral terminals.

The wireless communication apparatus may further include: a search unit that searches for and specifying the peripheral terminal around its own apparatus by using wireless communication. The instruction unit may instruct the peripheral terminal specified by the search unit to acquire the navigation message transmitted from the GPS satellite.

According to the preferred embodiment of the present invention, an instruction unit instructs a peripheral terminal to acquire a navigation message transmitted from a GPS satellite. In addition, an acquisition unit acquires the navigation message acquired by the peripheral terminal from the peripheral terminal. In addition, a calculation unit carries out a positioning calculation using the navigation message acquired from the peripheral terminal. According to this configuration, it is possible to carry out the positioning calculation using the navigation message acquired by the peripheral terminal. Accordingly, it is possible to shorten the time for searching for a GPS satellite and further shorten a positioning time.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated for explanatory purpose.

Figure 1:
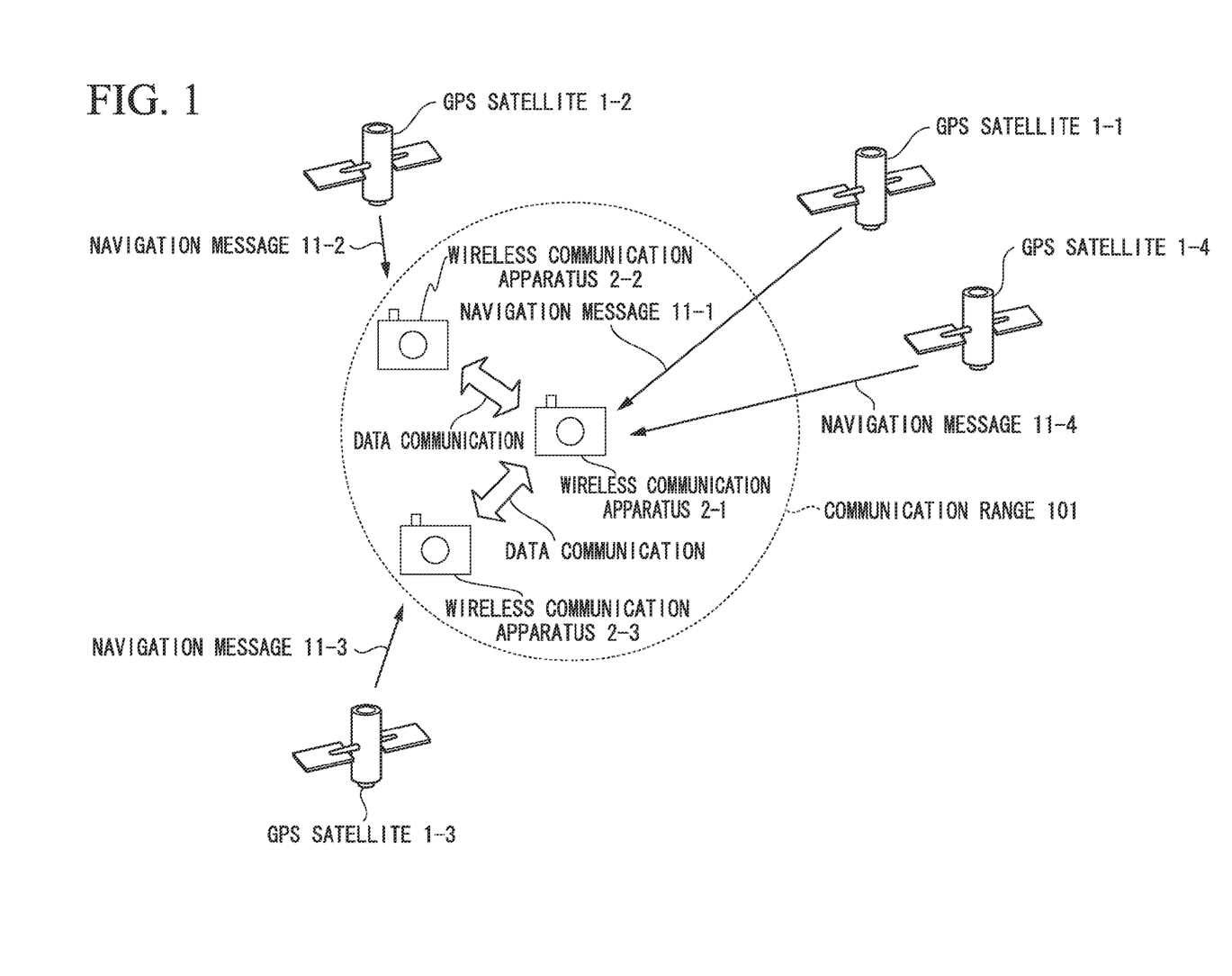
FIG. 1 is a schematic diagram illustrating an example when data is transmitted and received between a wireless communication apparatus and GPS satellites in accordance with a first preferred embodiment of the present invention.

FIG. 1 is a schematic diagram illustrating an example when data is transmitted and received between a wireless communication apparatus and GPS satellites in accordance with a first preferred embodiment of the present invention. Four GPS satellites are disposed on each of 6 orbits, which orbit 20,000 km over the earth. In the illustrated example, four GPS satellites 1-1 to 1-4 among a plurality of GPS satellites 1 are shown. These GPS satellites 1-1 to 1-4 use a frequency band of 1575.42 MHz and transmit navigation messages 11-1 to 11-4 to the ground.

In addition, three wireless communication apparatuses 2-1 to 2-3 are shown as wireless communication apparatuses 2 in the illustrated example. An example of the wireless communication apparatus 2 is a digital camera having a GPS function. The wireless communication apparatuses 2-1 to 2-3 capture the GPS satellites 1-1 to 1-4 so as to measure their current positions, and acquire the navigation messages 11-1 to 11-4 transmitted from the GPS satellites 1-1 to 1-4. The wireless communication apparatuses 2-1 to 2-3 carry out a positioning calculation using the acquired navigation messages 11-1 to 11-4.

In the first preferred embodiment, the wireless communication apparatuses 2-1 to 2-3 have, for example, other communication means such as a wireless local area network (LAN), as well as a GPS reception unit. In addition, in a communication scheme other than that of the GPS reception unit when positioning of a current position of its own apparatus is started for the first time, the wireless communication apparatus 2-1 searches for and specifies the wireless communication apparatuses 2-2 and 2-3 (peripheral terminals) in a communication range 101 of the communication scheme. The wireless communication apparatus 2-1 determines which of the specified wireless communication apparatuses 2-2 and 2-3 and its own apparatus captures which of the GPS satellites 1-1 to 1-4. Thereafter, the wireless communication apparatus 2-1 transmits a message that instructs the wireless communication apparatuses 2-2 and 2-3 to acquire the navigation messages 11-1 to 11-4 of the determined GPS satellites 1-1 to 1-4.

The wireless communication apparatuses 2-2 and 2-3 acquire the navigation messages 11-1 to 11-4 of the GPS satellites 1-1 to 1-4 determined by the wireless communication apparatus 2-1. The wireless communication apparatuses 2-2 and 2-3 transmit the acquired navigation messages 11-1 to 11-4 to the wireless communication apparatus 2-1. The wireless communication apparatus 2-1 carries out a positioning calculation using the navigation messages 11-1 to 11-4 of the GPS satellites 1-1 to 1-4 acquired by its own apparatus and the wireless communication apparatuses 2-2 and 2-3. In this case, the wireless communication apparatus 2-1 is designated as a wireless communication apparatus 2 that performs a start-up operation.

For example, the wireless communication apparatus 2-1 that performs the start-up operation may determine that its own wireless communication apparatus 2-1 captures the GPS satellites 1-1 and 1-4, the wireless communication apparatus 2-2 captures the GPS satellite 1-2, and the wireless communication apparatus 2-3 captures the GPS satellite 1-3. The wireless communication apparatus 2-1 transmits a message for instructing the wireless communication apparatus 2-2 to acquire the navigation message 11-2 by capturing the GPS satellite 1-2 to the wireless communication apparatus 2-2, and transmits a message for instructing the wireless communication apparatus 2-3 to acquire the navigation message 11-3 by capturing the GPS satellite 1-3 to the wireless communication apparatus 2-3. The wireless communication apparatus 2-1 acquires the navigation messages 11-1 and 11-4 by capturing the GPS satellites 1-1 and 1-4. In addition, the wireless communication apparatus 2-2 acquires the navigation message 11-2 by capturing the GPS satellite 1-2, and transmits the acquired navigation message 11-2 to the wireless communication apparatus 2-1. In addition, the wireless communication apparatus 2-3 acquires the navigation message 11-3 by capturing the GPS satellite 1-3, and transmits the acquired navigation message 11-3 to the wireless communication apparatus 2-1. Thereafter, the wireless communication apparatus 2-1 carries out a positioning calculation using the navigation messages 11-1 to 11-4.

As described above, the navigation messages 11-1 to 11-4 transmitted by the GPS satellites 1-1 to 1-4 are jointly acquired by a plurality of wireless communication apparatuses 2-1 to 2-3 and the positioning calculation is performed using the acquired navigation messages 11-1 to 11-4, so that it is possible to further shorten a time required for positioning than when the navigation messages 11-1 to 11-4 are acquired by only one wireless communication apparatus 2 to perform the positioning calculation.

Figure 2:
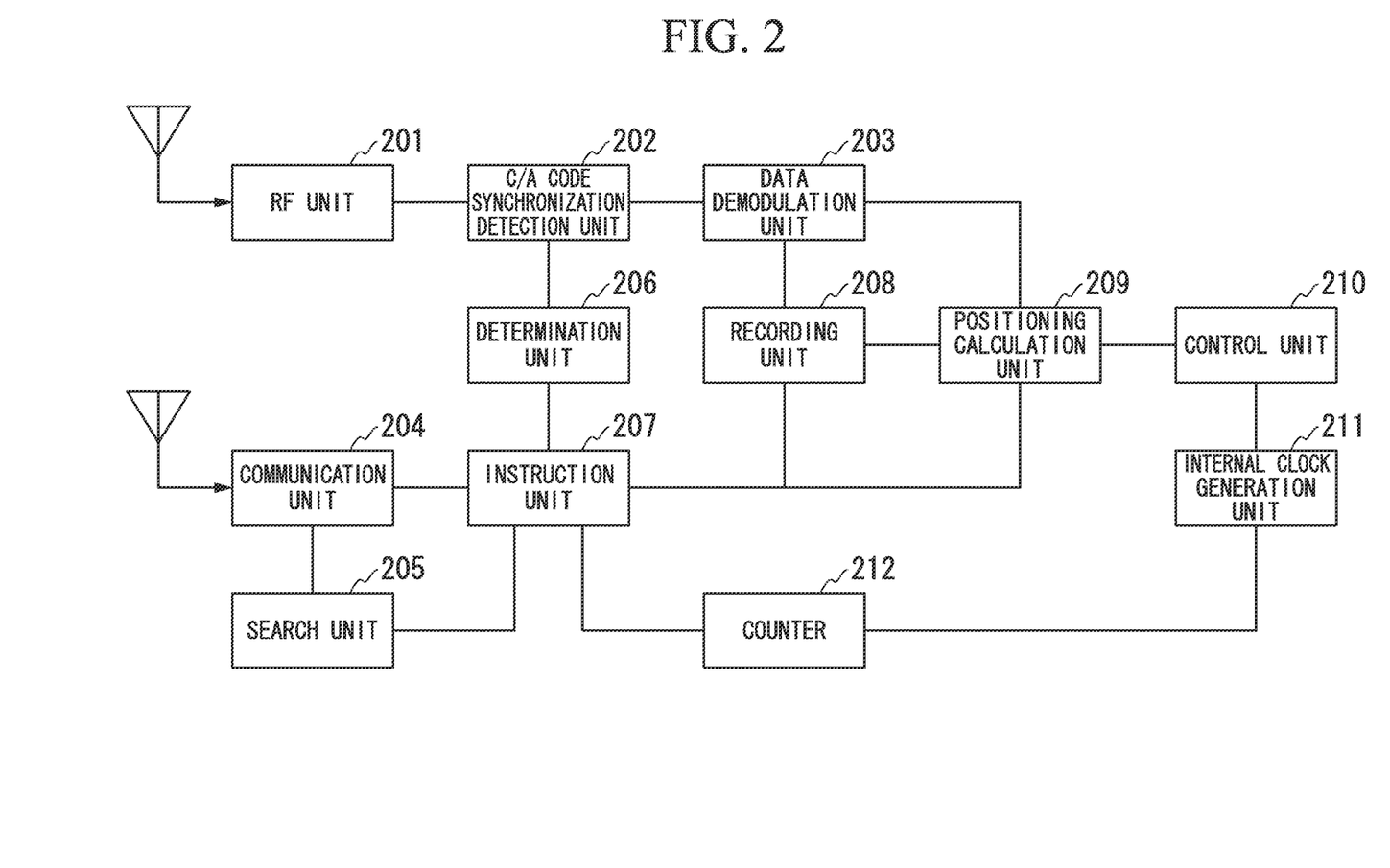
FIG. 2 is a block diagram illustrating a configuration of the wireless communication apparatus in accordance with the first preferred embodiment of the present invention.

Next, a configuration of the wireless communication apparatus 2 will be described. FIG. 2 is a block diagram illustrating the configuration of the wireless communication apparatus 2 in accordance with the first preferred embodiment of the present invention. In the illustrated example, the wireless communication apparatus 2 includes a radio frequency (RF) unit (a reception unit) 201, a C/A code synchronization detection unit 202, a data demodulation unit 203, a communication unit (an acquisition unit) 204, a search unit 205, a determination unit 206, an instruction unit 207, a recording unit 208, a positioning calculation unit (a calculation unit) 209, a control unit 210, an internal clock generation unit 211, and a counter 212.

The RF unit 201 acquires (receives) a navigation message 11 transmitted by the GPS satellite 1. The C/A code synchronization detection unit 202 detects which GPS satellite 1 has transmitted the navigation message 11 acquired by the RF unit 201. The data demodulation unit 203 demodulates the navigation message 11 modulated by a C/A code. The communication unit 204 performs wireless data communication with other wireless communication apparatuses 2. The search unit 205 searches for and specifies the other wireless communication apparatuses 2 in the communication range 101 of the communication unit 204 based on a communication result of the communication unit 204.

The determination unit 206 determines GPS satellites 1 to be captured (searched) by its own wireless communication apparatus 2 and the other wireless communication apparatuses 2 specified by the search unit 205 among a plurality of GPS satellites 1 for the acquisition of the navigation messages 11. The instruction unit 207 generates an acquisition instruction message for instructing the other wireless communication apparatuses 2 specified by the search unit 205 to acquire the navigation messages 11 of the GPS satellites 1 determined by the determination unit 206. In addition, the instruction unit 207 causes the communication unit 204 to transmit the generated acquisition instruction message to the other wireless communication apparatuses 2 specified by the search unit 205. In addition, the instruction unit 207 causes the communication unit 204 to transmit the navigation messages 11 demodulated by the data demodulation unit 203 to the other wireless communication apparatus 2 specified by the search unit 205. In addition, when the navigation messages 11 necessary for the positioning calculation have been recorded in the recording unit 208, the instruction unit 207 instructs the positioning calculation unit 209 to carry out the positioning calculation.

The recording unit 208 records the navigation messages 11 demodulated by the data demodulation unit 203, the navigation messages 11 transmitted from the other wireless communication apparatuses 2 received by the communication unit 204, and data including a local time of its own wireless communication apparatus 2. The positioning calculation unit 209 carries out the positioning calculation using the navigation messages 11. The control unit 210 controls parts provided in its own wireless communication apparatus 2. The internal clock generation unit 211 generates an internal system clock of its own wireless communication apparatus 2. The counter 212 performs a count operation based on a clock cycle of the system clock generated by the internal clock generation unit 211 according to a request from the instruction unit 207.

Figure 3:
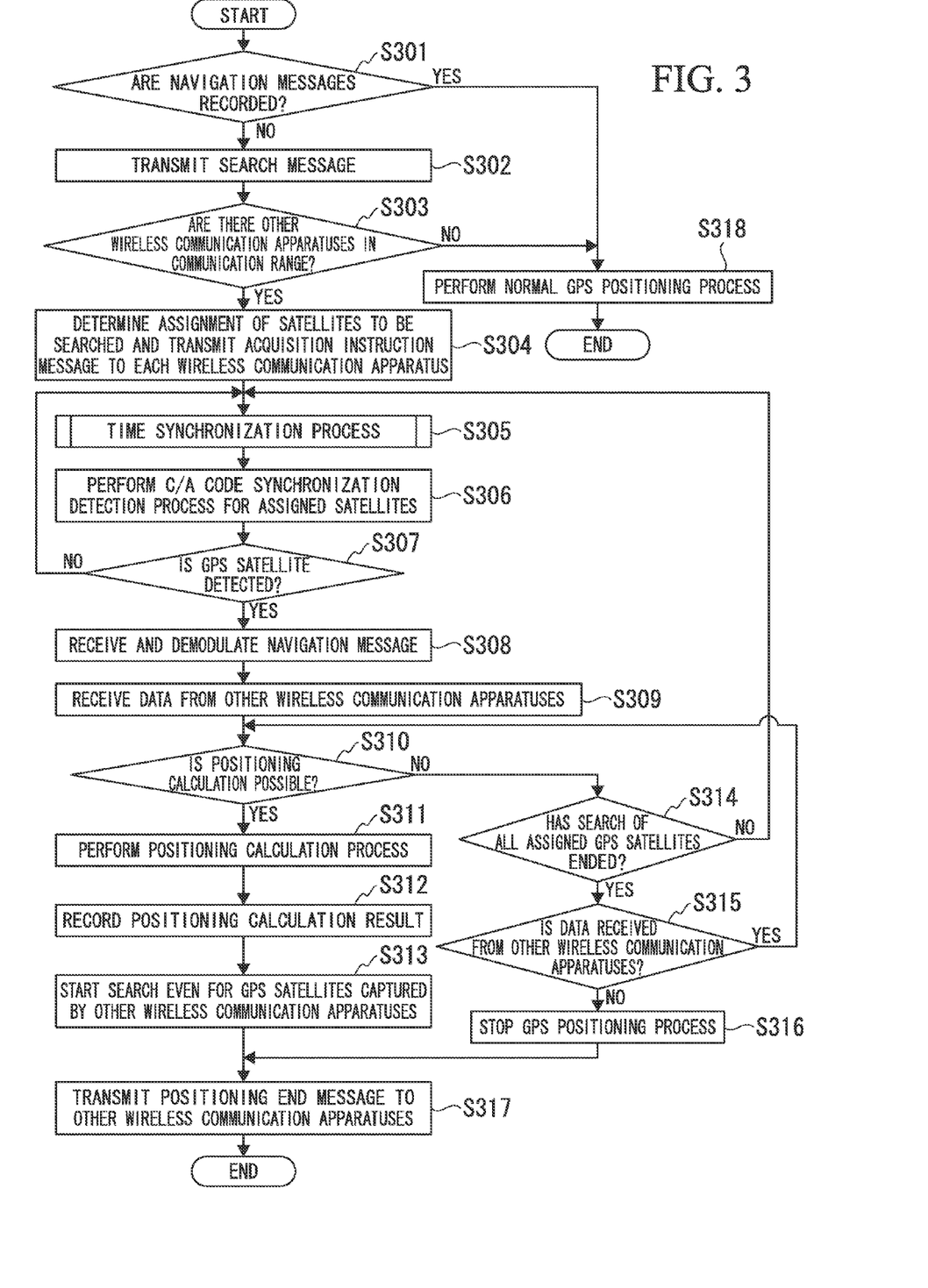
FIG. 3 is a flowchart illustrating an operation procedure of the wireless communication apparatus that performs a start-up operation in accordance with the first preferred embodiment of the present invention.

Next, an operation of the wireless communication apparatus 2 (the wireless communication apparatus 2-1 in the example illustrated in FIG. 1) that performs the start-up operation (receives the navigation messages 11 from the other wireless communication apparatuses 2) will be described. FIG. 3 is a flowchart illustrating an operation procedure of the wireless communication apparatus 2 that performs the start-up operation in accordance with the first preferred embodiment of the present invention.

(Step S301)

When the wireless communication apparatus 2 that performs the start-up operation starts GPS positioning, the instruction unit 207 determines whether or not previously acquired navigation messages 11 are recorded in the recording unit 208. If the instruction unit 207 determines that the previously acquired navigation messages 11 are recorded in the recording unit 208, the procedure proceeds to the process of step S318. Otherwise, the procedure proceeds to the process of step S302.

(Step S302)

Because the navigation messages 11 are not recorded in the recording unit 208, the search unit 205 transmits a search message to the periphery via the communication unit 204 so as to search for other wireless communication apparatuses 2 in the communication range 101 of the communication unit 204. Thereafter, the procedure proceeds to the process of step S303.

(Step S303)

When there are other wireless communication apparatuses 2 in the communication range 101 of the communication unit 204, the communication unit 204 receives response messages corresponding to the search message transmitted from the other wireless communication apparatuses 2. The search unit 205 determines that there are other wireless communication apparatuses 2 in the communication range 101 of the communication unit 204 when the communication unit 204 has received the response messages, and determines that there is no other wireless communication apparatus 2 in the communication range 101 of the communication unit 204 when the communication unit 204 has not received the response message. In addition, the search unit 205 specifies the other wireless communication apparatuses 2 when determining that there are other wireless communication apparatuses 2 in the communication range 101 of the communication unit 204. When the search unit 205 determines that there are other wireless communication apparatuses 2 in the communication range 101 of the communication unit 204, the procedure proceeds to the process of step S304. Otherwise, the procedure proceeds to the process of step S318.
(Step S304)

The determination unit 206 determines GPS satellites 1 from which its own wireless communication apparatus 2 and the other wireless communication apparatuses 2 specified by the search unit 205 among a plurality of GPS satellites 1 acquire navigation messages 11 (determines assignment of GPS satellites 1 to be searched). The instruction unit 207 generates an acquisition instruction message for instructing the other wireless communication apparatuses 2 specified by the search unit 205 to acquire the navigation messages 11 of the GPS satellites 1 determined by the determination unit 206. In addition, the instruction unit 207 causes the communication unit 204 to transmit the generated acquisition instruction message to the other wireless communication apparatuses 2 specified by the search unit 205. Thereafter, the procedure proceeds to the process of step S305.

The determination unit 206 may use any method as a method of determining a GPS satellite 1 to be searched by each wireless communication apparatus 2. Because there are 32 GPS satellites 1, for example, 32 is uniformly divided by the number of apparatuses including the other wireless communication apparatuses 2 searched by the search unit 205 and its own wireless communication apparatus 2, and the GPS satellites 1 to be searched may be assigned for each number. As in the example illustrated in FIG. 1, because there are its own wireless communication apparatus 2-1 and the other wireless communication apparatuses 2-2 to 2-3, the determination unit 206 may determine the assignment, for example, so that its own wireless communication apparatus 2-1 searches for GPS satellites 1 of GPS satellites 1-1 to 1-11, the other wireless communication apparatus 2-2 searches for GPS satellites 1 of GPS satellites 1-12 to 1-22, and the other wireless communication apparatus 2-3 searches for GPS satellites 1 of GPS satellites 1-23 to 1-32. In addition, the determination unit 206 may determine the assignment, for example, so that its own wireless communication apparatus 2-1 searches for GPS satellites 1 of GPS satellites 1-1, 4, 7, 10, 13, 16, 19, 22, 25, 28, and 31, the other wireless communication apparatus 2-2 searches for GPS satellites 1 of GPS satellites 1-2, 5, 8, 11, 14, 17, 20, 23, 26, 29, and 32, and the other wireless communication apparatus 2-3 searches for GPS satellites 1 of GPS satellites 1-3, 6, 9, 12, 15, 18, 21, 24, 27, and 30. In addition, it is also possible to stop a GPS function of its own wireless communication apparatus 2-1 for various reasons such as power consumption of its own wireless communication apparatus 2-1 and a reception state of a radio wave transmitted from the GPS satellite 1. In this case, without assignment to the wireless communication apparatus 2-1, the determination unit 206 may determine to assign the GPS satellites 1 to only the wireless communication apparatuses 2-2 and 2-3 to search for the GPS satellites 1.
(Step S305)

The wireless communication apparatus 2 that performs the start-up operation starts a time synchronization process, which is a process of performing time synchronization with the other wireless communication apparatus 2. Thereafter, the procedure proceeds to the process of step S306. The time synchronization process is performed for synchronization of time information between the wireless communication apparatuses 2 sharing a search of the GPS satellites 1. Specifically, local times of the other wireless communication apparatuses 2 are synchronized with a local time of its own wireless communication apparatus 2 based on the local time of its own wireless communication apparatus 2. Details of the time synchronization process will be described later.
(Step S306)

The C/A code synchronization detection unit 202 performs a C/A code synchronization detection process for GPS satellites 1 assigned to its own wireless communication apparatus 2. Thereafter, the procedure proceeds to the process of step S307. Each GPS satellite 1 has a unique C/A code, and the navigation message 11 transmitted from the GPS satellite 1 is modulated by the C/A code. In order to demodulate the navigation message 11 transmitted from the GPS satellite 1, the C/A code synchronization detection process is performed because it is necessary to detect a C/A code by which the received message is modulated.

Because the C/A code is constituted by 1,023 random numbers at a frequency of 1.023 MHz, it is necessary to generally detect one pattern of the C/A code with a phase shift so as to detect one GPS satellite 1. Accordingly, a decrease in the number of GPS satellites 1, which should be detected by each wireless communication apparatus 2, can shorten a time required for the C/A code synchronization detection process. That is, if the C/A code synchronization detection process is jointly performed by a plurality of wireless communication apparatuses 2, it is possible to shorten a time required for the C/A code synchronization detection process.
(Step S307)

The C/A code synchronization detection unit 202 determines whether or not the GPS satellite 1 has been detected in the process of step S306. When the C/A code synchronization detection unit 202 determines that the GPS satellite 1 has been detected, the procedure proceeds to the process of step S308. Otherwise, the procedure returns to the process of step S305. When the procedure returns to the process of step S305 and the C/A code synchronization detection process is re-performed in the process of step S306, the process is performed by selecting a pattern of a C/A code different from a pattern of a C/A code of which the detection has been attempted in an earlier C/A code synchronization detection process from patterns of C/A codes of GPS satellites 1 assigned to its own wireless communication apparatus 2.
(Step S308)

The RF unit 201 receives the navigation message 11 transmitted from the GPS satellite 1 detected by the C/A code synchronization detection unit 202. The data demodulation unit 203 performs a demodulation process to demodulate the navigation message 11 received by the RF unit 201. Thereafter, the procedure proceeds to the process of step S309. According to this process, the wireless communication apparatus 2 can acquire the navigation message 11 transmitted from the GPS satellite 1 allocated to its own apparatus.
(Step S309)

The communication unit 204 receives data including the navigation messages 11 of the GPS satellites 1 transmitted from the other wireless communication apparatuses 2 and navigation message reception times. Thereafter, the procedure proceeds to the process of step S310. According to this process, the wireless communication apparatus 2 can acquire navigation messages 11 transmitted from a plurality of GPS satellites 1. It is desirable to start a process of receiving the data including the navigation messages 11 of the GPS satellites 1 transmitted from the other wireless communication apparatuses 2 and the navigation message reception times in parallel with a process of searching for GPS satellites 1 after the process of step S304 has ended.

(Step S310)

The positioning calculation unit 209 determines whether or not it is possible to carry out the positioning calculation using the navigation messages 11 acquired in the process of step S308 and the process of step S309. When it is determined that the positioning calculation can be carried out using the acquired navigation messages 11, the procedure proceeds to the process of step S311. Otherwise, the procedure proceeds to the process of step S314. Here, in general, it is necessary to receive navigation messages 11 transmitted from four GPS satellites 1 so as to carry out the GPS positioning calculation. Accordingly, the positioning calculation unit 209 determines whether or not navigation messages 11 transmitted from four or more GPS satellites 1 have been acquired, and determines that the positioning calculation can be carried out using the acquired navigation messages 11 if the navigation messages 11 transmitted from the four or more GPS satellites 1 have been acquired.

(Step S311)

The positioning calculation unit 209 carries out the positioning calculation using the navigation messages acquired in the process of step S308 and the process of step S309. Thereafter, the procedure proceeds to the process of step S312.

(Step S312)

The positioning calculation unit 209 records the calculation result obtained in the process of step S311 on the recording unit 208. Thereafter, the procedure proceeds to the process of step S313.

(Step S313)

The C/A code synchronization detection unit 202 starts a search for GPS satellites 1 successfully detected by the other wireless communication apparatuses 2 so that only its own wireless communication apparatus 2 can continue positioning. Thereafter, the procedure proceeds to the process of step S314.

(Step S314)

The instruction unit 207 determines whether or not a search for all GPS satellites 1 allocated to its own wireless communication apparatus 2 has been completed. When the instruction unit 207 determines that the search for all the GPS satellites 1 allocated to its own wireless communication apparatus 2 has been completed, the procedure proceeds to the process of step S315. Otherwise, the procedure returns to the process of step S305.

(Step S315)

The instruction unit 207 determines whether or not navigation messages 11 of all GPS satellites 1 allocated to the other wireless communication apparatuses 2 have been acquired. When the instruction unit 207 determines that the navigation messages 11 of all the GPS satellites 1 allocated to the other wireless communication apparatuses 2 have been acquired, the procedure proceeds to the process of step S316. Otherwise, the procedure returns to the process of step S310.

(Step S316)

The instruction unit 207 stops a GPS positioning process. Thereafter, the procedure proceeds to the process of step S317.

(Step S317)

The instruction unit 207 transmits a positioning end message indicating an end of the GPS positioning process to the other wireless communication apparatuses 2 via the communication unit 204. Thereafter, the process ends.

(Step S318)

The wireless communication apparatus 2 performs a normal GPS positioning process. Thereafter, the process ends. For example, time-out is provided in a reception waiting time of a response message for a search message to be transmitted in the process of step S302, and the normal GPS positioning process is performed if the response message is not returned.

By executing the above-described process of steps S301 to S318, the wireless communication apparatus 2 that performs the start-up operation can cause the other wireless communication apparatuses 2 to acquire navigation messages 11 from GPS satellites 1. In addition, the wireless communication apparatus 2 that performs the start-up operation can perform positioning using the navigation messages 11 acquired by the other wireless communication apparatuses 2 and the navigation message 11 acquired by its own wireless communication apparatus 2.

Figure 4:
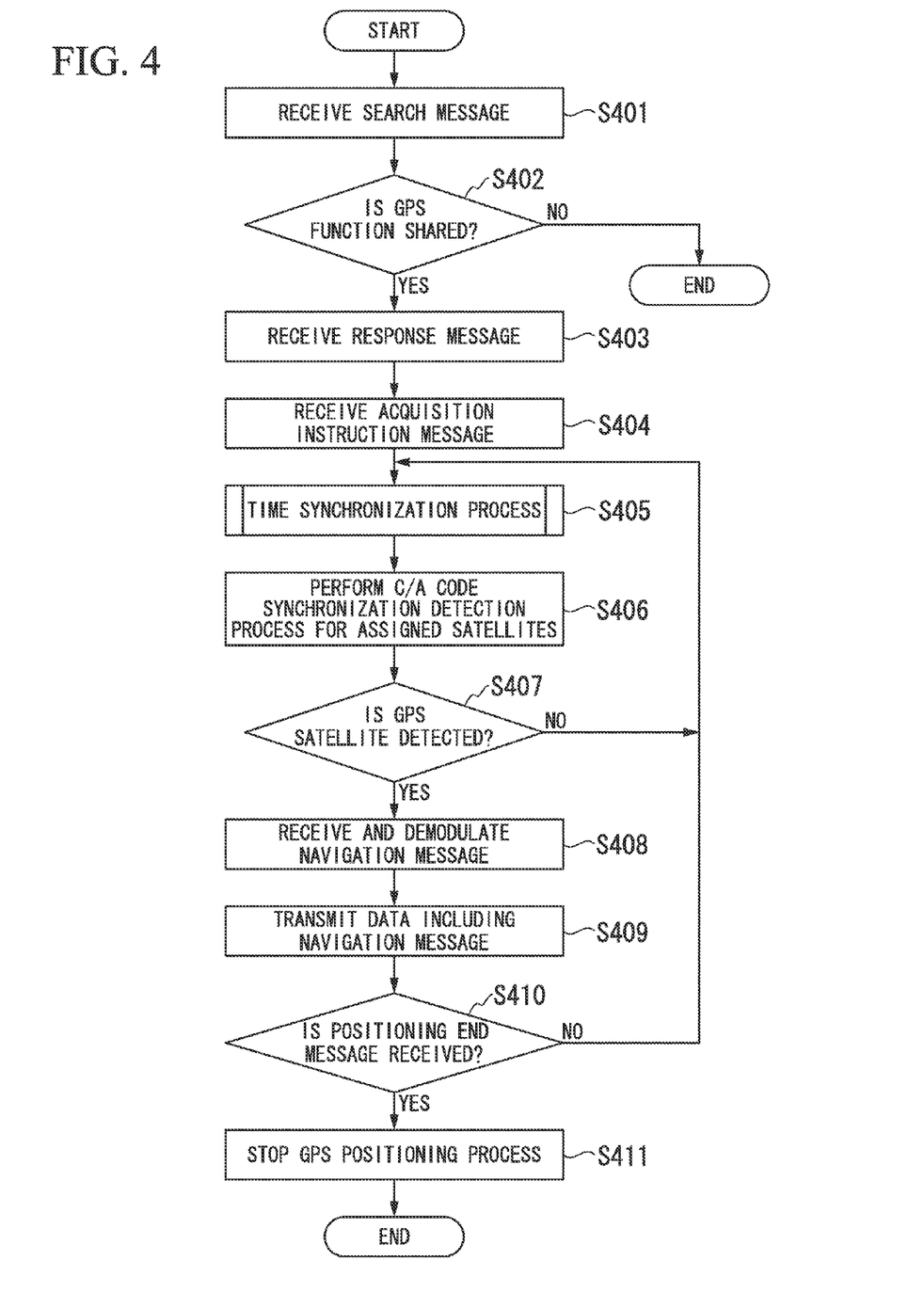
FIG. 4 is a flowchart illustrating the operation procedure of the wireless communication apparatuses that transmit navigation messages in accordance with the first preferred embodiment of the present invention.

Next, an operation procedure of wireless communication apparatuses 2 (the wireless communication apparatuses 2-2 and 2-3 in the example illustrated in FIG. 1) that transmit the navigation messages 11 to the wireless communication apparatus 2 that performs the start-up operation will be described. FIG. 4 is a flowchart illustrating the operation procedure of the wireless communication apparatuses 2 that transmit the navigation messages 11 to the wireless communication apparatus 2 that performs the start-up operation in accordance with the first preferred embodiment of the present invention.

(Step S401)

The communication unit 204 of the wireless communication apparatus 2 that transmits the navigation message 11 to the wireless communication apparatus 2 that performs the start-up operation receives a search message transmitted from the wireless communication apparatus 2 that performs the start-up operation. Thereafter, the procedure proceeds to step S402.

(Step S402)

The instruction unit 207 determines whether or not a GPS function of its own wireless communication apparatus 2 is shared. When the instruction unit 207 determines that the GPS function of its own wireless communication apparatus 2 is shared, the procedure proceeds to the process of step S403. When it is determined that the GPS function is not shared, the process ends. As the case in which it is determined that the GPS function of its own wireless communication apparatus 2 is not shared, for example, there is a case in which the GPS function of its own wireless communication apparatus 2 is turned off, or the like.

(Step S403)

The instruction unit 207 transmits a response message for notifying that the GPS function is shared to the wireless communication apparatus 2 that performs the start-up operation via the communication unit 204. Thereafter, the procedure proceeds to the process of step S404. As illustrated in FIG. 3, upon receipt of the response message, the wireless communication apparatus 2 that performs the start-up operation determines assignment of GPS satellites 1 to be searched by each wireless communication apparatus 2, and transmits an acquisition instruction message to other wireless communication apparatuses 2.

(Step S404)

The communication unit 204 receives the acquisition instruction message transmitted from the wireless communication apparatus 2 that performs the start-up operation. Thereafter, the procedure proceeds to the process of step S405.

(Step S405)

The wireless communication apparatus 2 that transmits the navigation message 11 to the wireless communication apparatus 2 that performs the start-up operation starts a time synchronization process, which is a process of performing time synchronization with the wireless communication apparatus 2 that performs the start-up operation. Thereafter, the procedure proceeds to the process of step S406. Details of the time synchronization process will be described.

(Step S406)

The C/A code synchronization detection unit 202 performs a C/A code synchronization detection process for a GPS satellite 1 indicated by the acquisition instruction message received in the process of step S404. Thereafter, the procedure proceeds to the process of step S407.

(Step S407)

The C/A code synchronization detection unit 202 determines whether or not the GPS satellite 1 has been detected in the process of step S406. When the C/A code synchronization detection unit 202 determines that the GPS satellite 1 has been detected, the procedure proceeds to the process of step S408. Otherwise, the procedure returns to the process of step S405. When the procedure returns to the process of step S405 and the C/A code synchronization detection process is re-performed in the process of step S406, a process is performed by selecting a pattern of a C/A code different from a pattern of a C/A code of which the detection has been attempted in an earlier C/A code synchronization detection process from patterns of C/A codes of GPS satellites 1 assigned to its own wireless communication apparatus 2.

(Step S408)

The RF unit 201 receives the navigation message 11 transmitted from the GPS satellite 1 detected by the C/A code synchronization detection unit 202. The data demodulation unit 203 performs a demodulation process to demodulate the navigation message 11 received by the RF unit 201. Thereafter, the procedure proceeds to the process of step S409. According to this process, the wireless communication apparatus 2 can acquire the navigation message 11 transmitted from the GPS satellite 1 allocated to its own apparatus.

(Step S409)

The instruction unit 207 includes reception time information of the navigation message 11 based on a local time of its own wireless communication apparatus 2 in the navigation message 11 demodulated by the data demodulation unit 203, and transmits the navigation message 11 to the wireless communication apparatus 2 that performs the start-up operation via the communication unit 204. Thereafter, the procedure proceeds to the process of step S410.

(Step S410)

The instruction unit 207 determines whether or not a positioning end message has been received from the wireless communication apparatus 2 that performs the start-up operation after the navigation message 11 has been transmitted in the process of step S409. If the instruction unit 207 determines that the positioning end message has been received, the procedure proceeds to the process of step S411. Otherwise, the procedure returns to the process of step S405.

(Step S411)

The instruction unit 207 stops a GPS positioning process. Thereafter, the process ends.

By executing the above-described process of steps S401 to S411, the wireless communication apparatus 2 that transmits the navigation message 11 to the wireless communication apparatus 2 that performs the start-up operation can acquire the navigation message 11 transmitted from the GPS satellite 1 according to a request from the wireless communication apparatus 2 that performs the start-up operation, and transmit the acquired navigation message 11 to the wireless communication apparatus 2 that performs the start-up operation.

Next, time synchronization between the wireless communication apparatuses 2 will be described. When the wireless communication apparatus 2 carries out a positioning calculation based on the navigation messages 11 transmitted by the GPS satellites 1, times at which the navigation messages 11 have been received are necessary. The times at which the GPS satellites 1 have transmitted the navigation messages 11 is recorded in the navigation messages 11 transmitted by the GPS satellites 1. Thus, if the wireless communication apparatus 2 completely acquires synchronization of time information with the GPS satellite 1, it is possible to easily obtain a distance between the GPS satellite 1 and the wireless communication apparatus 2. However, it is not possible to acquire synchronization with a GPS time of the GPS satellite 1 without mounting a highly precise clock as mounted in the GPS satellite 1 in the wireless communication apparatus 2. Accordingly, it is necessary to obtain a time error between the GPS satellite 1 and the wireless communication apparatus 2 simultaneously when the positioning calculation is carried out. In the first preferred embodiment, because navigation messages 11 transmitted by a plurality of GPS satellites 1 are jointly acquired by a plurality of wireless communication apparatuses 2 and one wireless communication apparatus 2 among the plurality of wireless communication apparatuses 2 carries out the positioning calculation, it is necessary to provide a standard time among the plurality of wireless communication apparatuses 2.

Figure 5:
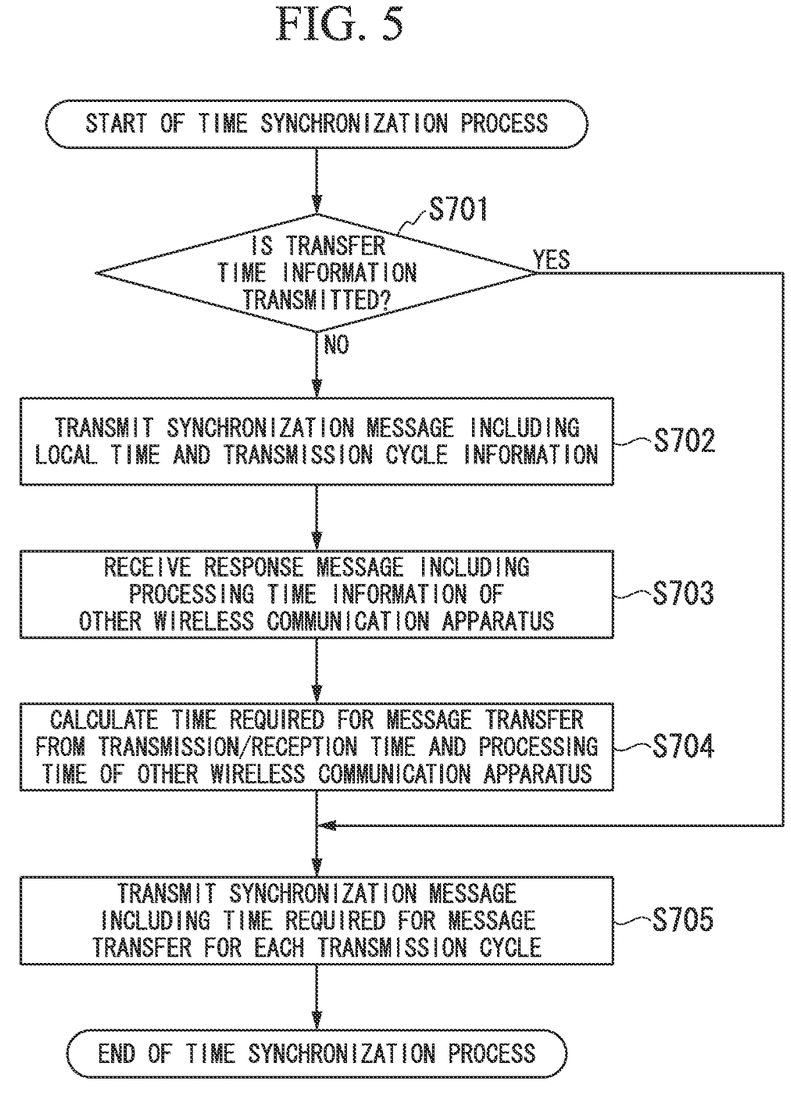
FIG. 5 is a flowchart illustrating a processing procedure of a time synchronization process of the wireless communication apparatus that performs the start-up operation in accordance with the first preferred embodiment of the present invention.

Next, the time synchronization process in which the wireless communication apparatus 2 that performs the start-up operation performs time synchronization with the other wireless communication apparatuses 2 will be described. FIG. 5 is a flowchart illustrating a processing procedure of a time synchronization process of the wireless communication apparatus 2 that performs the start-up operation in accordance with the first preferred embodiment of the present invention. In the wireless communication, a transfer time required for communication is diverse. Accordingly, even when time information is simply transmitted from its own wireless communication apparatus 2 to the other wireless communication apparatuses 2, it is possible to set a standard time between the wireless communication apparatuses 2 by considering the transfer time because an error for the transfer time occurs when the other wireless communication apparatuses 2 have received the time information.

(Step S701)

The instruction unit 207 of the wireless communication apparatus 2 that performs the start-up operation determines whether or not transfer time information indicating a transfer time is transmitted to the other wireless communication apparatuses 2. When the instruction unit 207 determines that the transfer time information is transmitted to the other wireless communication apparatuses 2, the procedure proceeds to the process of step S705. Otherwise, the procedure proceeds to the process of step S702.

(Step S702)

The instruction unit 207 transmits a synchronization message including a local time and transmission cycle information of its own wireless communication apparatus 2 to the other wireless communication apparatuses 2. In addition, the instruction unit 207 records a local time at which the synchronization message has been transmitted in the recording unit 208. Thereafter, the procedure proceeds to the process of step S703. The wireless communication apparatus 2 that performs the start-up operation periodically transmits the synchronization message for time synchronization. Transmission cycle information indicates a cycle in which the synchronization message is transmitted. For example, when the wireless communication apparatus 2 that performs the start-up operation transmits the synchronization message in a cycle of 10 ms, transmission cycle information indicating the cycle of 10 ms is transmitted to the other wireless communication apparatuses 2.

(Step S703)

The communication unit 204 receives response messages corresponding to the synchronization message transmitted from the other wireless communication apparatuses 2. Processing time information indicating processing times in the other wireless communication apparatuses 2 is included in the response messages. The processing time in the other wireless communication apparatuses 2 is a time taken until the other wireless communication apparatus 2 transmits the response message after receiving the synchronization message. In addition, the instruction unit 207 records a local time at which the communication unit 204 has received the response message in the recording unit 208. Thereafter, the procedure proceeds to the process of step S704.

(Step S704)

The instruction unit 207 obtains a transfer time required for transmission or reception in the following Expression (1) using the time at which the synchronization message has been transmitted, the time at which the response message has been received, and the processing time information included in the response message. Thereafter, the procedure proceeds to the process of step S705.

Transfer Time={(Reception Time of Response Message)−(Time at which Synchronization Message Has Been Transmitted)−(Processing Time in Other Wireless Communication Apparatus 2)}/2    (1)

(Step S705)

The instruction unit 207 transmits the synchronization message including the local time of its own wireless communication apparatus 2, the transmission cycle information, and the transfer time information calculated in the process of step S704 to the other wireless communication apparatuses 2 when a transmission cycle has been reached. Thereafter, the procedure proceeds to the process of step S306 of FIG. 3. The instruction unit 207 periodically executes the time synchronization process in parallel with a process of detecting the GPS satellites 1, and transmits the synchronization message to the other wireless communication apparatuses 2 for every transmission cycle.

Figure 6:
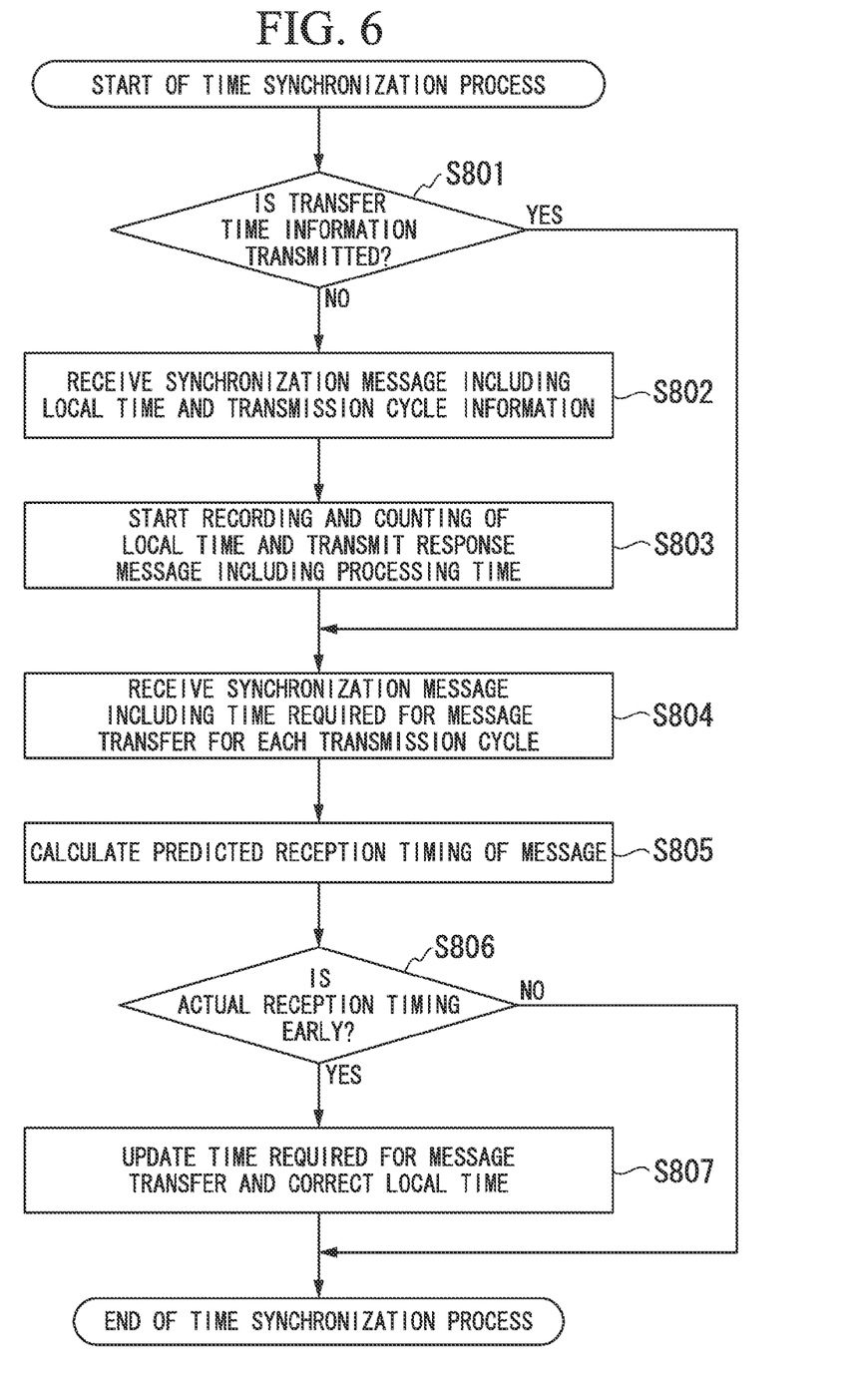
FIG. 6 is a flowchart illustrating a processing procedure of a time synchronization process of the wireless communication apparatus that transmits the navigation message in accordance with the first preferred embodiment of the present invention.

Next, the time synchronization process in which the wireless communication apparatus 2 that transmits the navigation message 11 to the wireless communication apparatus 2 that performs the start-up operation performs time synchronization with the wireless communication apparatus 2 that performs the start-up operation will be described. FIG. 6 is a flowchart illustrating a processing procedure of a time synchronization process of the wireless communication apparatus 2 that transmits the navigation message 11 to the wireless communication apparatus 2 that performs the start-up operation in accordance with the first preferred embodiment of the present invention.

(Step S801)

The instruction unit 207 of the wireless communication apparatus 2 that transmits the navigation message 11 to the wireless communication apparatus 2 that performs the start-up operation determines whether or not transfer time information indicating a transfer time is received from the wireless communication apparatus 2 that performs the start-up operation. When the instruction unit 207 determines that the transfer time information is received, the procedure proceeds to the process of step S804. Otherwise, the procedure proceeds to the process of step S802.

(Step S802)

The communication unit 204 receives a synchronization message including a local time and transmission cycle information of the wireless communication apparatus 2 that performs the start-up operation transmitted from the wireless communication apparatus 2 that performs the start-up operation. Thereafter, the procedure proceeds to the process of step S803.

(Step S803)

The instruction unit 207 records the local time of the wireless communication apparatus 2 that performs the start-up operation included in the synchronization message received by the communication unit 204 in the recording unit 208. In addition, the instruction unit 207 advances the local time of the wireless communication apparatus 2 that performs the start-up operation using a clock generated by the internal clock generation unit 211 and the counter 212. That is, in the wireless communication apparatus 2 that transmits the navigation message 11 to the wireless communication apparatus 2 that performs the start-up operation, the time synchronized with the local time of the wireless communication apparatus 2 that performs the start-up operation is counted. This time becomes a standard time. Thereby, although there is an error for a transfer time, the wireless communication apparatus 2 that performs the start-up operation and the wireless communication apparatus 2 that transmits the navigation message 11 to the wireless communication apparatus 2 that performs the start-up operation can equally advance the standard time. In addition, the response message including a processing time, which is the time taken until the response message is transmitted after the synchronization message is received, is transmitted to the wireless communication apparatus 2 that performs the start-up operation via the communication unit 204 by the instruction unit 207. Thereafter, the procedure proceeds to the process of step S804.

(Step S804)

The communication unit 204 receives the synchronization message including the local time, the transmission cycle information, and the transfer time information of the wireless communication apparatus 2 that performs the start-up operation transmitted from the wireless communication apparatus 2 that performs the start-up operation. Thereafter, the procedure proceeds to the process of step S805.

(Step S805)

The instruction unit 207 calculates the time at which the next synchronization message is transmitted using the transmission cycle information and the transfer time information included in the synchronization message received in step S804. Thereafter, the procedure proceeds to the process of step S806. Specifically, the instruction unit 207 calculates that the next synchronization message is transmitted after the time obtained by subtracting the transfer time from the transmission cycle included in the synchronization message after its own wireless communication apparatus 2 receives the synchronization message.

(Step S806)

In the first preferred embodiment, the time at which the next synchronization message is transmitted calculated in step S805 is assumed to be in synchronization with a transmission time at which the wireless communication apparatus 2 that performs the start-up operation transmits the synchronization message. When the next synchronization message has actually been received, the instruction unit 207 determines whether or not an actual reception time of the synchronization message is earlier than a predicted reception time of the synchronization message. When the instruction unit 207 determines that actual reception time of the synchronization message is earlier than the predicted reception time of the synchronization message, the procedure proceeds to the process of step S807. Otherwise, the process ends.

(Step S807)

The instruction unit 207 updates a message transfer time, and corrects the standard time. Thereafter, the process ends. The instruction unit 207 periodically executes the time synchronization process in parallel with a process of detecting the GPS satellite 1.

For example, it can be seen that an actual transfer time is 7 ms if a synchronization message of which the reception time is 3 ms earlier than the predicted reception time is received when a first obtained transfer time is 10 ms and then the synchronization message is received. Accordingly, for the standard time continuously counted by the wireless communication apparatus 2 that transmits the navigation message 11 to the wireless communication apparatus 2 that performs the start-up operation, it is possible to more accurately perform synchronization of the standard time by subtracting 7 ms from the local time of the wireless communication apparatus 2 that performs the start-up operation.

In addition, for example, it can be seen that an actual transfer time is 18 ms if a synchronization message of which the reception time is 8 ms later than the predicted reception time is received when a first obtained transfer time is 10 ms and then the synchronization message is received. However, because it is possible to obtain a more accurate standard time when the transfer time is short, the message transfer time and the standard time are not corrected when the synchronization message of which the reception timing is later than the predicted reception timing is received.

It is possible to perform synchronization of the standard time of each wireless communication apparatus 2 by executing the above-described process of steps S701 to S705 and the above-described process of steps S801 to S807.

Figure 7:
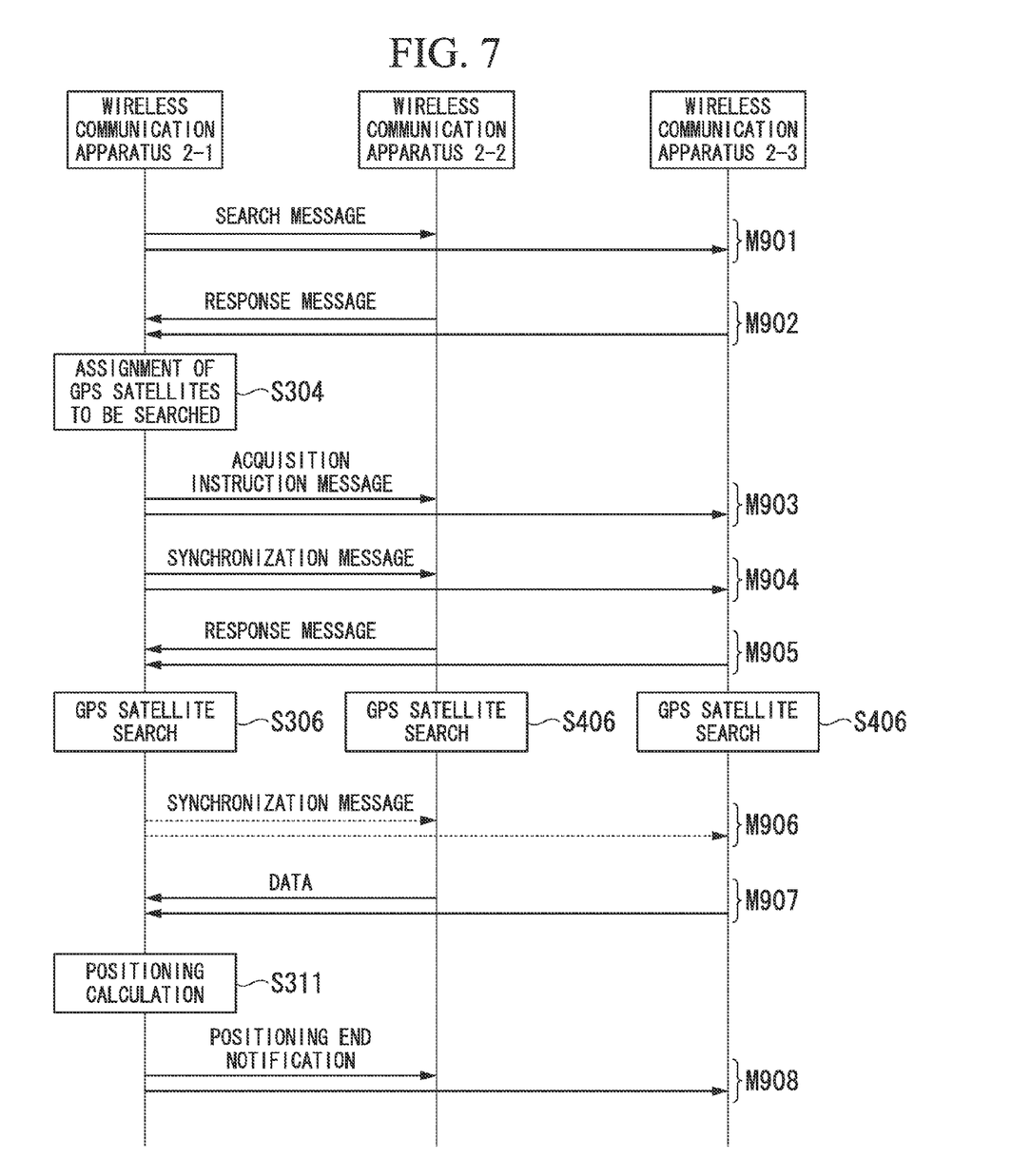
FIG. 7 is a sequence diagram illustrating a message flow between the wireless communication apparatuses in accordance with the first preferred embodiment of the present invention.

Next, a message flow between wireless communication apparatuses 2 in the process described by using FIGS. 3 and 4 will be described. FIG. 7 is a sequence diagram illustrating the message flow between the wireless communication apparatuses 2 in accordance with the first preferred embodiment of the present invention. In the illustrated example, the wireless communication apparatus 2-1 is a wireless communication apparatus 2 that performs a start-up operation. In addition, the wireless communication apparatuses 2-2 and 2-3 are wireless communication apparatuses 2 that transmit navigation messages 11 to the wireless communication apparatus 2 that performs the start-up operation.

First, the wireless communication apparatus 2-1 transmits a search message to the wireless communication apparatuses 2-2 and 2-3 (M901). The wireless communication apparatuses 2-2 and 2-3 transmit response messages to the wireless communication apparatus 2-1 (M902). The wireless communication apparatus 2-1 assigns GPS satellites 1 to be searched by the wireless communication apparatuses 2-2 and 2-3 (S304), and transmits an acquisition instruction message to the wireless communication apparatuses 2-2 and 2-3 (M903).

Subsequently, the wireless communication apparatus 2-1 transmits a synchronization message for time synchronization among the wireless communication apparatuses 2-1 to 2-3 (M904). The wireless communication apparatuses 2-2 to 2-3 transmit response messages each including a processing time to the wireless communication apparatus 2-1 (M905).

The wireless communication apparatuses 2-1 to 2-3 start a search of allocated GPS satellites 1 to be searched (S306 and S406).

During a process of searching for the GPS satellites 1, the wireless communication apparatus 2-1 periodically continuously transmits the synchronization message (M906). After detecting the allocated GPS satellites 1 and receiving navigation messages 11, the wireless communication apparatuses 2-2 and 2-3 transmit data including the navigation messages 11 and reception times based on the local time of the wireless communication apparatus 2-1 to the wireless communication apparatus 2-1 (M907). The wireless communication apparatus 2-1 receives the data including the navigation messages 11 and the reception times, and carries out a positioning calculation (S311). After the positioning calculation is completed, the wireless communication apparatus 2-1 transmits a positioning end message to the wireless communication apparatuses 2-2 and 2-3 (M908).

Figure 8:
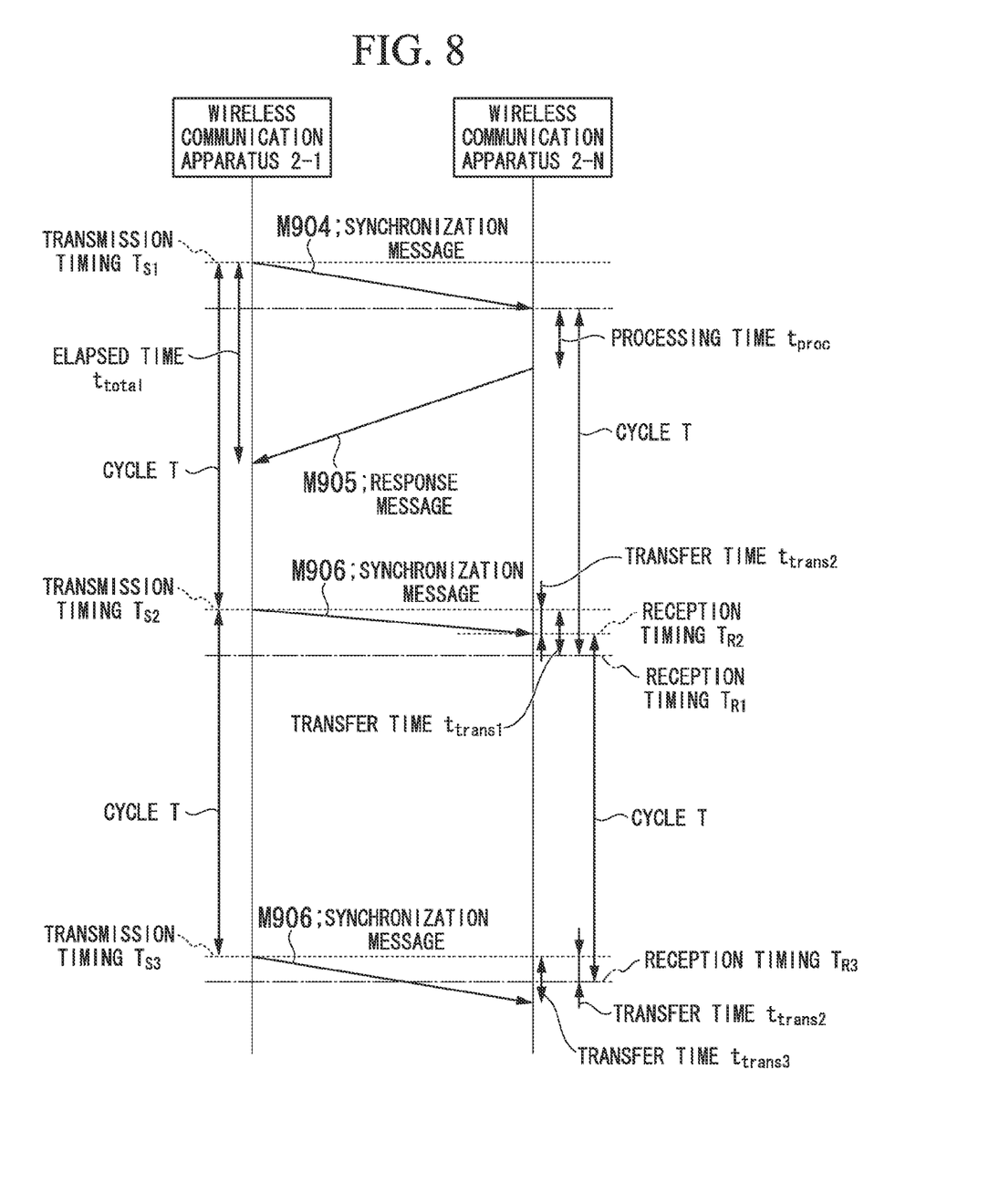
FIG. 8 is a sequence diagram illustrating a message flow between the wireless communication apparatuses in a time synchronization process in accordance with the first preferred embodiment of the present invention.

Next, a message flow between wireless communication apparatuses 2 in the time synchronization process described by using FIGS. 5 and 6 will be described. FIG. 8 is a sequence diagram illustrating a message flow between the wireless communication apparatuses 2 in the time synchronization process in accordance with the first preferred embodiment of the present invention. In the illustrated example, a wireless communication apparatus 2-1 is a wireless communication apparatus 2 that performs a start-up operation. In addition, a wireless communication apparatus 2-N is a wireless communication apparatus 2 that transmits a navigation message 11 to the wireless communication apparatus 2 that performs the start-up operation.

As illustrated, the wireless communication apparatus 2-1 transmits the synchronization message in a cycle T. Transmission timings at which transmission is performed in this cycle T are assumed to be $T_{S1}$, $T_{S2}$, $T_{S3}$, . . . , respectively. First, the wireless communication apparatus 2-1 transmits the synchronization message of M904. The wireless communication apparatus 2-N receives the synchronization message. This reception time is a transfer time later than the time at which the wireless communication apparatus 2-1 has transmitted the synchronization message. The wireless communication apparatus 2-N transmits a response message after executing an internal process such as acquiring a local time of the wireless communication apparatus 2-1 from the received synchronization message. At this time, when the internal process is performed, the wireless communication apparatus 2-N requires a processing time $t_{proc}$. If the time taken until the wireless communication apparatus 2-1 receives the response message after transmitting a first synchronization message is designated as an elapsed time $t_{total}$, a transfer time $t_{trans1}$ can be calculated using the above-described Expression (1).

Next, when the wireless communication apparatus 2-1 transmits the synchronization message of M906, the wireless communication apparatus 2-N expects a reception timing $T_{R1}$ at which the cycle T has elapsed after receiving the synchronization message of M904. The wireless communication apparatus 2-N can predict a transmission timing of the synchronization message of M906 by considering the calculated transmission time $t_{trans1}$. That is, the wireless communication apparatus 2-N can synchronize the standard time with the local time of the wireless communication apparatus 2-1 by identifying a timing at which the wireless communication apparatus 2-1 transmits the synchronization message. For example, the wireless communication apparatus 2-N can predict that a transfer time is $t_{trans2}$ when actually receiving the synchronization message at a reception timing $T_{R2}$. This transfer time $t_{trans2}$ is compared to a reception time of the synchronization message based on the transmission timing $T_{S2}$ predicted by the wireless communication apparatus 2-N, and their difference is calculated.

Next, when the wireless communication apparatus 2-1 transmits the synchronization message of M906 at a transmission timing $T_{S3}$, the wireless communication apparatus 2-N predicts that the synchronization message is received at a reception timing $T_{R3}$ after the cycle T from the reception timing $T_{R2}$ at which the earlier synchronization message has been received. As illustrated, when a time of (Cycle T+Transfer Time $t_{trans3}$) is required until the wireless communication apparatus 2-N receives the synchronization message after the wireless communication apparatus 2-1 transmits the synchronization message, this transfer time $t_{trans3}$ is not reflected in a subsequent process because $t_{trans3} > t_{trans2}$. Although there is variation in the transfer time in wireless communication, it is possible to perform more highly accurate time synchronization by iterating correction for the use of a short transfer time. It is possible to perform synchronization of a standard time between wireless communication apparatuses 2 by performing the above process.

As described above, according to the first preferred embodiment of the present invention, the wireless communication apparatus 2 that performs the start-up operation searches for and specifies other wireless communication apparatuses 2 in the communication range 101 of the communication unit 204 when starting positioning of a current position of its own apparatus for the first time. The wireless communication apparatus 2 that performs the start-up operation determines which of the specified wireless communication apparatuses 2 and its own apparatus captures which of the GPS satellites 1-1 to 1-4. Thereafter, the wireless communication apparatus 2 that performs the start-up operation transmits a message that instructs the other wireless communication apparatuses 2 to acquire navigation messages 11 of the determined GPS satellites 1.

The other wireless communication apparatuses 2 acquire the navigation messages 11 of the GPS satellites 1 determined by the wireless communication apparatus 2 that performs the start-up operation. The other wireless communication apparatuses 2 transmit the acquired navigation messages 11 to the wireless communication apparatus 2 that performs the start-up operation. The wireless communication apparatus 2 that performs the start-up operation carries out a positioning calculation using navigation messages 11 of GPS satellites 1 acquired by its own apparatus and the other wireless communication apparatuses 2.

Accordingly, the plurality of wireless communication apparatuses 2-1 to 2-3 jointly acquire the navigation messages 11-1 to 11-4 transmitted by the GPS satellites 1-1 to 1-4 and carry out positioning calculations using the acquired navigation messages 11-1 to 11-4, thereby shortening a time for searching for the GPS satellites 1 and further shortening a positioning time than when one wireless communication apparatus 2 acquires the navigation messages 11-1 to 11-4 and carries out a positioning calculation.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A wireless communication apparatus comprising:
a determination unit that determines a different global positioning system (GPS) satellite from among a plurality of GPS satellites to be allocated to each of a plurality of peripheral terminals,
an instruction unit that instructs each of the plurality of peripheral terminals to acquire a navigation message transmitted from the different GPS satellite allocated to each of the plurality of peripheral terminals, each of the plurality of peripheral terminals wirelessly transmitting the navigation message to the wireless communication apparatus;
an acquisition unit that acquires the navigation message, which has been acquired by each of the plurality of peripheral terminals, from each of the plurality of peripheral terminals; and
a calculation unit that carries out a positioning calculation by using the navigation message acquired by each of the plurality of peripheral terminals.

2. A wireless communication apparatus comprising:
a determination unit that determines a global positioning system (GPS) satellite from among a plurality of GPS satellites to be allocated to the wireless communication apparatus and a different GPS satellite from among the plurality of GPS satellites to be allocated to each of one or more peripheral terminals;
a reception unit that receives a navigation message transmitted from the GPS satellite allocated to the wireless communication apparatus;
an instruction unit that instructs each of the one or more peripheral terminals to acquire the navigation message transmitted from the different GPS satellite allocated to each of the one or more peripheral terminals, the one or more peripheral terminals wireless transmitting the navigation message to the wireless communication apparatus;
an acquisition unit that acquires the navigation message, which has been acquired by each of the one or more peripheral terminals, from each of the one or more peripheral terminals; and
a calculation unit that carries out a positioning calculation by using the navigation message acquired by the acquisition unit from each of the one or more peripheral terminals and the navigation message received by the reception unit.

3. The wireless communication apparatus according to claim 1, further comprising:
a communication unit that transmits a synchronization message for acquiring time synchronization with its own apparatus to the peripheral terminal.

4. The wireless communication apparatus according to claim 3, wherein the communication unit transmits the synchronization message including information indicating a time taken to transfer data between its own apparatus and the peripheral terminal.

5. The wireless communication apparatus according to claim 2, further comprising:
a communication unit that transmits a synchronization message for acquiring time synchronization with its own apparatus to the peripheral terminal.

6. The wireless communication apparatus according to claim 5, wherein
the communication unit transmits the synchronization message including information indicating a time taken to transfer data between its own apparatus and the peripheral terminal.

7. The wireless communication apparatus according to claim 1, further comprising:
- a search unit that searches for and specifies the plurality of peripheral terminals using wireless communication around the wireless communication apparatus,
- wherein the instruction unit instructs each of the plurality of peripheral terminals specified by the search unit to acquire the navigation message transmitted from the different GPS satellite allocated to each of the plurality of peripheral terminals.

8. The wireless communication apparatus according to claim 2, further comprising:
- a search unit that searches for and specifies the one or more peripheral terminals using wireless communication around the wireless communication apparatus,
- wherein the instruction unit instructs the one or more peripheral terminals specified by the search unit to acquire the navigation message transmitted from the different GPS satellite allocated to each of the one or more peripheral terminals.

* * * * *